United States Patent [19]
Jakubowski

[11] 3,820,882
[45] June 28, 1974

[54] AUTOMATIC DIAPHRAGM CONTROL FOR MOTION PICTURE CAMERAS USED ON OPERATION MICROSCOPES

[75] Inventor: Heinz Jakubowski, Oberkochen, Germany

[73] Assignee: Carl Zeiss Stiftung d/b/a Carl Zeiss Heindenheim on the Brenz, Wurttemberg, Germany

[22] Filed: Mar. 19, 1973

[21] Appl. No.: 342,766

[30] Foreign Application Priority Data
Mar. 25, 1972 Germany.......................... 7211495

[52] U.S. Cl..................... 352/131, 350/17, 350/19, 350/81, 352/141
[51] Int. Cl. ........................................ G03b 29/00
[58] Field of Search .......... 350/17, 19, 81; 352/141, 352/131

[56] References Cited
UNITED STATES PATENTS
3,106,129  10/1963  Frenic............................. 350/19 X
3,292,490  12/1966  Moore............................. 350/19 X
3,419,326  12/1968  Borner............................ 352/141

OTHER PUBLICATIONS
"Attachment Camera" Printed in Western Germany by Carl Zeiss, Oberkochen Wuerttemberg, 1964 (Oct.) p. 1–5.

Primary Examiner—Monroe H. Hayes
Attorney, Agent, or Firm—Stonebraker & Shepard

[57] ABSTRACT

An arrangement for attaching a motion picture camera to a microscope used in a surgical operation, to enable automatic control of the diaphragm aperture of the camera as the operation proceeds. The microscope is provided with a beam splitter which directs part of the light laterally into an adapter which contains an iris diaphragm adjusted by a motor. The adapter also has a reflecting unit for reflecting the light upwardly toward a motion picture camera mounted on the adapter in a position laterally of the microscope axis. In the camera is a light responsive cell which measures the light reaching the camera and which, through a cable connection to an amplifier, controls the motor to adjust the aperture of the diaphragm in the adapter to make it larger or smaller, as required. The amplifier and the motor are preferably in a unit separate from the adapter itself.

5 Claims, 2 Drawing Figures

3,820,882

AUTOMATIC DIAPHRAGM CONTROL FOR MOTION PICTURE CAMERAS USED ON OPERATION MICROSCOPES

BACKGROUND OF THE INVENTION

The invention relates to the control of the diaphragm aperture when using a motion picture camera (cine camera) with a microscope during a surgical operation.

For the filming of surgical operations through microscopes, the normal equipment heretofore used consists of a motion picture camera without a photographic lens, attached to the operation microscope. The proper exposure of the film depends on the light source of the microscope and the sensitivity of the film, as well as the exposure speed, the brightness of the object, and the total magnification of the system.

Usually when operations are to be photographed, the diaphragm aperture or stop value (f number) for various magnifications and for various operations is determined by making trial exposures. These empirically determined aperture values are then to be set by the photographer while photographing the various stages of the operation. However, with surgery in progress and with the necessity for the microscope and the camera to be covered with sterilized cloth, the photographer is greatly hindered in this task. Where the operation microscope has a zoom lens system providing for continuous change of primary magnification, it is even more difficult to select the correct diaphragm setting.

The object of the present invention is to avoid the disadvantages and difficulties of manual diaphragm setting, and to facilitate the filming of a surgical procedure with an operation microscope. According to the invention, this is achieved by providing a motorized adjustable diaphragm in the optical path between the microscope and the motion picture camera, the adjusting motor of the diaphragm being connected to and controlled by the output of a photometric device in the camera. Preferably this is accomplished by the use of an adapter structure fastened to and extending laterally from the microscope to receive light directed into the adapter by a beam splitter in the microscope. The adapter contains a motor driven iris diaphragm, adjusted by a motor which is preferably in a housing separate from but attached to the adapter unit. The motion picture camera is mounted on the adapter beyond the iris diaphragm, so that the diaphragm controls the amount of light reaching the camera. The camera contains a photometric device for measuring the amount of light reaching the camera, and the output of the photometric device is delivered through a cable to the motor which controls the aperture of the iris diaphragm, preferably through an amplifying unit which may be in the same housing with the motor. It is desirable to connect the motor to the iris diaphragm through a gear transmission. It is further desirable for the exposure control system to be operatively coupled with the speed regulator of the motion picture camera, since the proper diaphragm aperture for given light conditions is dependent in part on the speed of the camera.

The present invention has the advantage that the diaphragm aperture automatically adapts to the light conditions and the change of magnification even when using the zoom lens system. As a result, the film is always correctly exposed, which is particularly vital in making motion pictures of surgical operations, because a highly sensitive color film is used. Another advantage is that, when the automatic diaphragm setting arrangement of the present invention is used, the camera can be controlled remotely, either by a cable release, or an electrical or radio release, enabling the person in charge of the photography to be at a distance where he is not in the way of the surgeons actually performing the operation. Furthermore, the arrangement of the present invention may be used for a television camera as well as a motion picture camera.

DESCRIPTION OF THE PREFERRED EMBODIMENT

Figure 1:
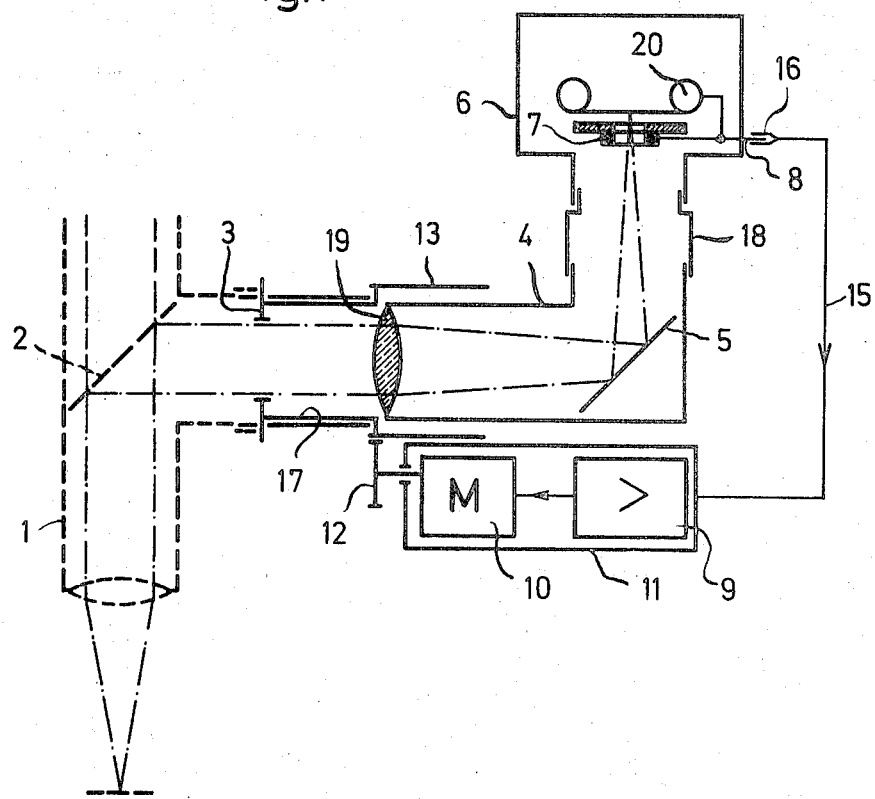
FIG. 1 is a schematic section taken centrally through apparatus in accordance with a preferred embodiment of the invention.
Figure 2:
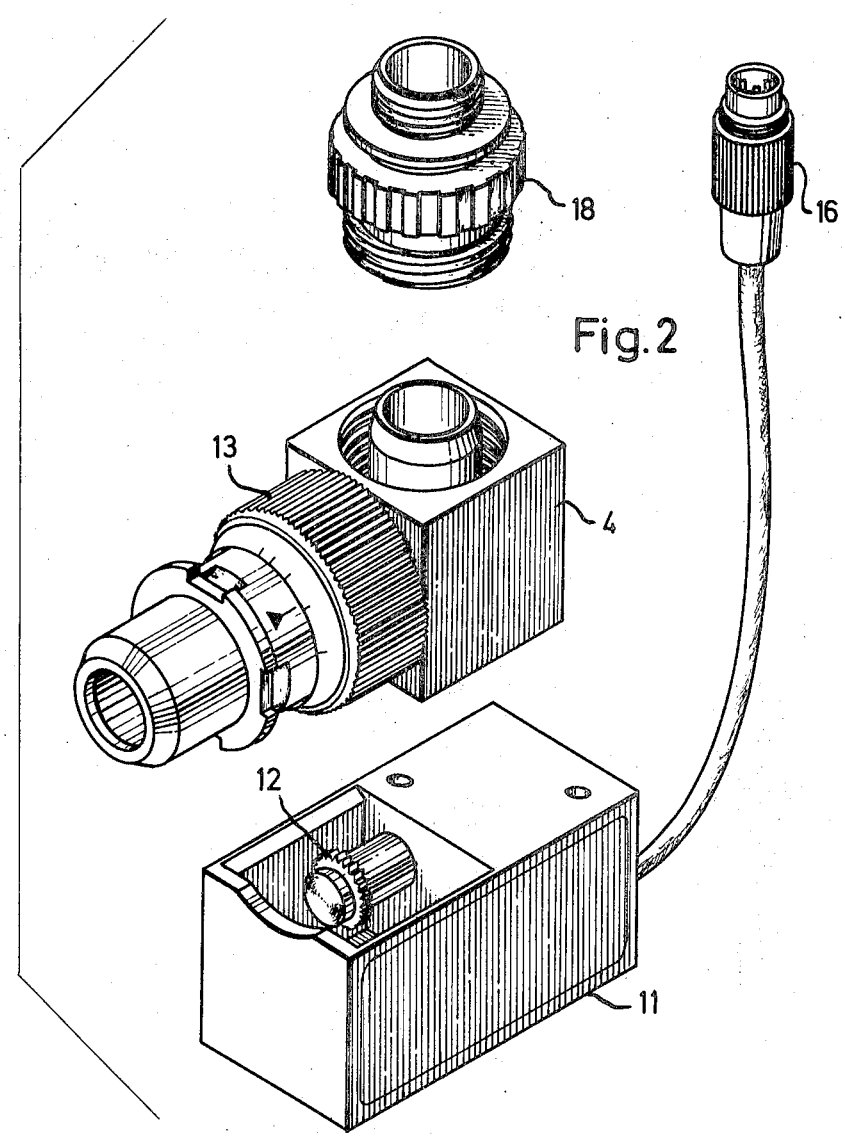
FIG. 2 is an exploded view showing in perspective some of the individual components of the apparatus.

The microscope, of conventional construction, is shown schematically at 1. It contains a conventional beam splitter 2 which deflects part of the parallel bundle of light rays through an angle of 90° to pass laterally through a lateral tube of the microscope, while the rest of the bundle of rays passes upwardly to the eye piece of the microscope. The deflected rays pass through an adjustable iris diaphragm schematically shown at 3, mounted at the near end of an adapter structure 4.

The camera (usually a motion picture or cine camera, although it could be a television camera) is mounted at the far end, optically speaking, of the adapter 4. The camera axis can be in line with the axis passing through the diaphragm 3, if desired, but usually it is preferred to have the camera axis at a right angle to the axis passing through the diaphragm, in which case the adapter is provided with a reflecting element 5 (mirror or prism) to deflect the rays so that they travel along a camera axis arranged at 90° to the axis extending through the diaphragm. This is plainly seen in FIG. 1, and will be well understood by those skilled in the art.

The camera itself is shown schematically at 6, and may be of conventional construction. The camera contains a photometric device such as the conventional photo conductive cell 7, in a conventional circuit connected to an output jack 8 attached to the camera housing.

At 9 there is shown schematically an exposure control and amplifying system of conventional design controlling the operation of an electric motor 10, the system 9 and motor 10 preferably being mounted together in a small housing 11 separate from but attached to and carried by the adapter unit 4. The shaft of the motor 10 is provided with a gear 12 which meshes with the diaphragm aperture adjusting ring 13 which rotates around a fixed part of the adapter housing 4.

The above mentioned output jack 8 of the camera is connected by a conventional flexible cable 15 to the input of the amplifying and control system 9. The camera preferably also has a conventional speed controller schematically shown at 20 and also connected through the cable 15 to the exposure control 9, so that the operation of the motor 10 in increasing or decreasing the aperture of the iris diaphragm 3 is dependent partly on the amount of light as measured by the photometric device 7 and partly on the speed at which the camera is operated, since proper exposure of the film depends on both of these factors.

The external diaphragm adjusting ring 13, driven by the gear 12 of the motor 10, adjusts the aperture of the diaphragm 3 in the conventional manner, the physical connection between the external ring and the usual internal diaphragm ring being through any suitable physical connection such as the conventional internal bushing 17. The free end of the cable 15 is connected to the jack 8 of the camera by a conventional connector 16, preferably threaded to prevent accidental disengagement.

The part 18 is a threaded connector which screws at one end into a suitable opening in the adapter housing 4, and at the other end into the lens opening of the camera. Various optical arrangements can be used, within the skill of the art, many variations being possible. Ordinarily the usual camera lens is removed from the camera when photographing through a microscope, and a lens system of one or more elements or components, all collectively indicated schematically at 19 in FIG. 1, is used in the adapter 4, in place of the normal camera lens. The lens system 19 may be, as previously mentioned a zoom lens system, if desired, in which case it also is preferably adjusted by a separate motor with remote control, so that the photographer can be at a distance from this apparatus, out of the way of the surgeon.

What is claimed is:

1. A device for automatic control of exposure of film in a motion picture camera of the type having photometric means therein when such camera is used to photograph objects seen through an operation microscope, said device comprising, in combination:
   a. a connecting unit attached to said microscope and to said camera for holding said camera in fixed position relative to and spaced from said microscope;
   b. an adjustable iris diaphragm mounted in said connecting unit for controlling the amount of light entering said camera from said microscope;
   c. motor means for adjusting said diaphragm; and
   d. electrical control means operatively connecting said photometric means in the camera to said motor means for controlling the aperture of said iris diaphragm from said photometric means.

2. Mechanism as defined in claim 1, wherein said motor means is contained in a housing separate from and attachable to said unit.

3. Mechanism as defined in claim 1, wherein said control means includes an exposure control and amplifying system, and wherein said motor means and said exposure control and amplifying system are mounted together in a housing separate from said unit.

4. Mechanism as defined in claim 1, wherein said motor means is operatively connected to said iris diaphragm through a gear transmission and a driving bushing.

5. Mechanism as defined in claim 1, wherein said camera includes a speed regulator, and wherein said control means is operatively connected to said speed regulator as well as to said photometric means.

* * * * *